United States Patent [19]

Renaud

[11] Patent Number: 4,861,634
[45] Date of Patent: Aug. 29, 1989

[54] METHOD FOR INTERNALLY LINING DUCTS AND SLEEVES FOR DUCTS LINED WITH THIS METHOD

[75] Inventor: Alain S. Renaud, Montfermeil, France

[73] Assignee: Coopetanche S.A., Vaux-le-Penil, France

[21] Appl. No.: 944,952

[22] Filed: Dec. 22, 1986

[30] Foreign Application Priority Data

Dec. 27, 1985 [FR] France .................................. 85 19349
Apr. 21, 1986 [FR] France .................................. 86 05693

[51] Int. Cl.$^4$ .............................................. B32B 31/20
[52] U.S. Cl. .................................... 428/36.1; 156/156; 156/273.9; 156/287; 156/294
[58] Field of Search ................... 156/273.9, 275.5, 287, 156/294, 295, 307.7, 156; 138/124, 125; 428/36

[56] References Cited

U.S. PATENT DOCUMENTS

| | | | |
|---|---|---|---|
| 3,133,846 | 5/1964 | Gandy | 156/294 |
| 3,176,353 | 4/1965 | Pilliod et al. | 156/295 |
| 3,235,289 | 2/1966 | Jones | 156/275.7 |
| 3,239,403 | 3/1966 | Williams et al. | 156/273.9 |
| 3,506,519 | 4/1970 | Blumenuranz | 156/273.9 |
| 3,711,347 | 1/1973 | Wagner et al. | 156/295 |
| 4,207,130 | 6/1980 | Barber | 156/287 |
| 4,273,605 | 6/1981 | Ross | 156/287 |
| 4,361,451 | 11/1982 | Renaud | 156/294 |
| 4,428,793 | 1/1984 | Sato et al. | 156/295 |
| 4,576,205 | 3/1986 | Morinaga et al. | 156/287 |

FOREIGN PATENT DOCUMENTS 475828 7/1974 Australia .............................. 156/294
0234142 9/1987 European Pat. Off. .

Primary Examiner—Merrell C. Cashion, Jr.
Attorney, Agent, or Firm—McAulay Fisher Nissen & Goldberg

[57] ABSTRACT

A method for internally lining ducts and sleeves for ducts lined in accordance with this method are provided. The inner lining sleeve is formed in the duct by the action of a uniform pressure on the inner face of a second sleeve in a form of a sheet made from a sealed synthetic material whose outer face is provided with fibers. This pressure acts so as to enlarge the section of this sleeve by plastic deformation of said sheet and to apply the sleeve against the inner face of a first sleeve made from a composite material permeable over the whole of its thickness and coated with a heat hardenable resin. The section of said first sleeve enlarges without the composite material undergoing elastic or plastic deformation. The two joined sleeves continue to enlarge their sections until the outer face of the first sleeve is applied firmly against the inner face of an envelope in the form of a sheet of sealed synthetic material. The pressure continues to act at a controllable temperature and applies the sleeve and envelope assembly against the inner face of the duct. After hardening of the resin, the pressure is removed. The second sleeve adheres by its fibers to the first sleeve. The second sleeve may advantageously be used as inflatable balloon for application of the pressure. Heating means and means for controlling the polymerization temperature may be provided.

19 Claims, 2 Drawing Sheets

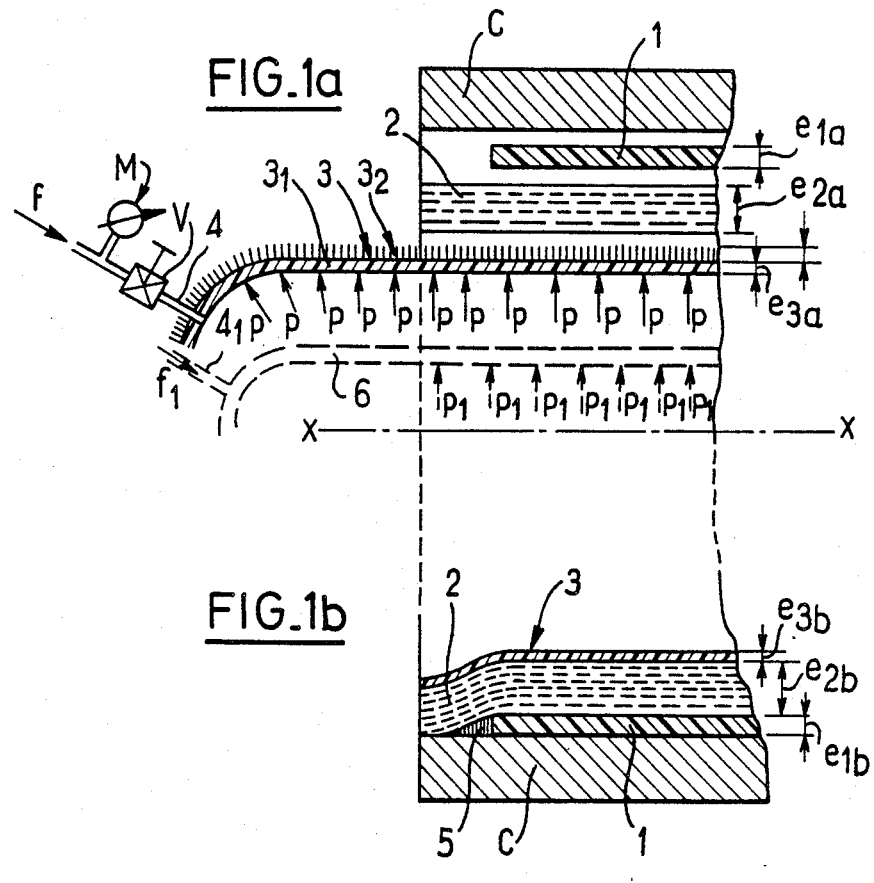
FIG.1a
FIG.1b
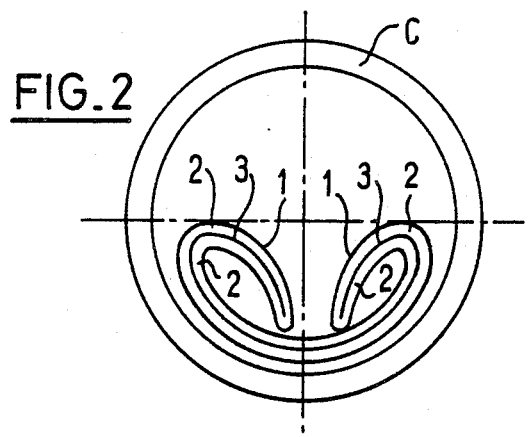
FIG.2

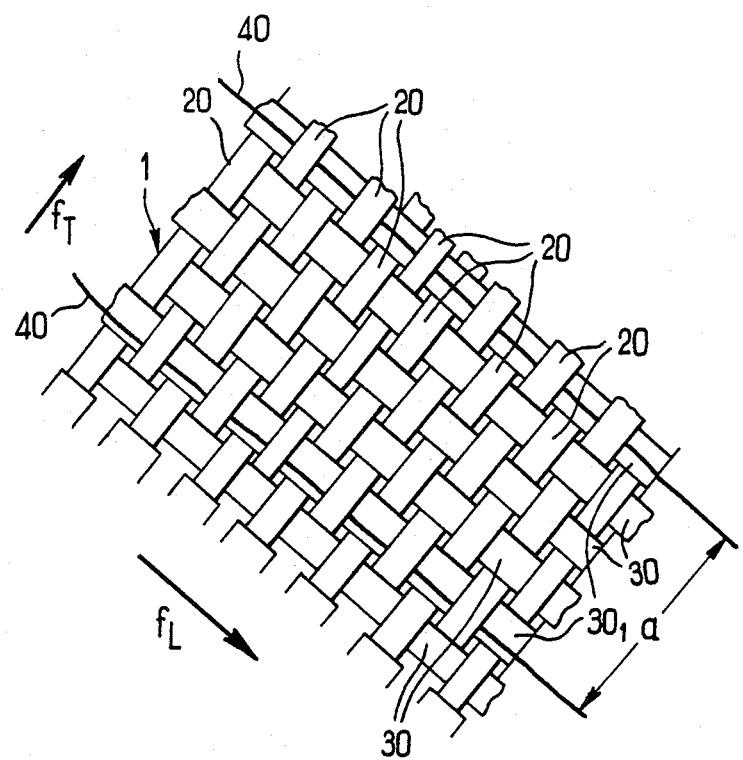
FIG_3

METHOD FOR INTERNALLY LINING DUCTS AND SLEEVES FOR DUCTS LINED WITH THIS METHOD

BACKGROUND OF THE INVENTION

1. Field of the Invention

The present invention relates to a method for internally lining ducts, said lining being in the form of a self supporting sleeve.

2. Description of the Prior Art

A method is known for lining ducts which is characterized in that a sleeve permeable over at least a part of its thickness to a heat hardenable resin, such as an epoxy resin, is introduced into the duct, said sleeve being able to enlarge its section under the action of a pressure exerted on its internal wall and thus being able to adapt its section to that of the duct, without the composite material used for said sleeve undergoing an elastic or plastic deformation; the pressure on the internal sleeve, in this known method, is exerted via an inflatable balloon until the external wall of said sleeve is applied against the internal wall of said duct, and it is held until the resin hardens, the pressure and the temperature of the fluid for inflating the baloon being controlled during the while operation. After hardening of the resin, said balloon is deflated and removed. In this known method, a composite material is used which may be entirely permeable to a heat hardenable resin, such for example as a material formed by at least an assembly comprising a first layer in the form of a framework, for example in the form of a woven glass fiber fabric; a second layer made from a non woven material such as a glass mat; and a third layer in the form of a framework, for example in the form of a woven glass fiber fabric.

Such a process and such a composite material are known from the French patents 82 12 732 of the 21 July 1982 and 83 08 918 of the 30 May 1983 in the names of the applicant.

The aim of the present invention is to improve and simplify the above described method while making it more reliable.

SUMMARY OF THE INVENTION

In accordance with the invention, the method for the internal lining of ducts includes the following steps:

(1) preparation of the inner face of the duct in a way known per se;

(2) preparation of a first sleeve made from a composite material permeable to a heat hardenable resin and able to enlarge its section under the action of an internal pressure in a way known per se without said composite material undergoing elastic or plastic deformation;

(3) preparation of a second sleeve whose longitudinal edges are joined together and which is made from a synthetic material having on its outer face fibers or similar capable of adhering to the inner heat hardenable resin coated face of said first sleeve, said second sleeve only being able to enlarge its section under the action of a pressure by plastic deformation of the material forming it; said sleeve being able to serve as an inflatable balloon;

(4) if desired, preparation of an envelope whose longitudinal edges are joined together and which is made from a synthetic material impermeable to a heat hardenable resin and whose section may be enlarged under the action of a fluid;

(5) if desired, preparation of an inflatable balloon known per se;

(6) introduction of said second sleeve capable of serving as inflatable balloon in said first sleeve;

(7) if desired, introduction of said inflatable baloon known per se in said second sleeve, said second sleeve—which does not serve as an inflatable baloon——and said inflatable balloon being introduced into said first sleeve;

(8) impregnation of said first sleeve with a heat hardenable resin, ensuring that said resin penetrates over the whole thickness of said first sleeve as far as its inner face;

(9) if desired, introduction into said envelope of the assembly comprising said first resin impregnated sleeve and at least said second sleeve able to serve as an inflatable balloon and, if desired, an inflatable balloon, in the case where said second sleeve do not serve as an inflatable balloon.

(10) introduction into the duct of the assembly mentioned above under point 8 or under point 9, the assembly being bent so as to facilitate introduction thereof in one end of the duct and transport thereof to the other end of the duct,

(11) introduction of a pressurized fluid either in said second sleeve (if it serves as inflatable balloon or in the inflatable baloon) the temperature and the pressure being controlled depending on the conditions on the site, namely atmospheric conditions, ground conditions, underground water conditions, etc.

(12) enlargement of the section of said second sleeve by plastic deformation of the synthetic material forming it until the outer fiber carrying face of said sleeve is applied against the inner face of said first sleeve and adheres to this face simultaneous enlargement of the section of said first sleeve and of said second sleeve until the external face of said first sleeve is applied either against the inner wall of the duct, or against the inner face of said envelope, whose section is then enlarged simultaneously with the sections of said first and second sleeves until the external face of the envelope is applied firmly against the inner wall of the duct,

(13) maintenance of the internal pressure and of the temperature in a way known per se until the resin hardens,

(14) progressive reduction of the application pressure and cutting of the ends of said second sleeve which project from the ends of the duct, in the case where said second sleeve has served as inflatable balloon, the part of said second sleeve remaining in the duct, by its adherence to said first sleeve, having become an integral part of said composite material;

(15) total deflation of the balloon (if it is used) and withdrawal of the balloon.

Said envelope (if used) is slightly shorter than the duct, the ends of the assembly of the first and second sleeves then being applied directly against the inner wall at the ends of the duct for adhering thereto, the space between the ends of the envelope and the parts of said first sleeve adhering to the ends of the duct being filled with resin coming from said first sleeve; said resin forming a sealing plug after hardening.

The inner lining sleeve of a duct is characterized in that it is formed of a first sleeve made from a composite material permeable to a heat hardenable resin and a second sleeve in the form of a sealing sheet made from a synthetic material having fibers on its external face, said second sleeve adhering with its fiber carrying surface to said first sleeve so as to form an integral part of the composite material after hardening of the resin, a sealing envelope non-permeable to a heat hardenable resin being possibly provided enclosing said first sleeve.

In a particular embodiment, said sleeve one of the constituent parts at least of which (first sleeve, second sleeve, sealing envelope) includes controllable heating means for at least partially hardening the heat hardenable resin.

At least one of the constituent parts of the sleeve,— namely said first sleeve, said second sleeve and said envelope - comprises by incorporating it at least one heating element, at least one of the ends of which is connected to means for controlling the temperature during the hardening period of said resin.

Said heating element or elements may be incorporated in one of the layers of the composite material of said first sleeve.

Said heating element or elements may be incorporated in or disposed on the strand in the direction parallel to the longitudinal axis x—x of the sleeve and of the duct of woven fabric which forms at least one of the layers of said composite material or in a non woven fabric in the direction parallel to the longitudinal axis x—x of the sleeve and of the duct, which forms at least one layer of said composite material.

The heating element or elements are in the form of metal wires or strips, heating being provided by electric means.

BRIEF DESCRIPTION OF THE DRAWINGS

Other characteristics and advantages will be clear from the following description given by way of example and from the accompanying drawings, in which FIG. 1 shows in section and schematically the arrangement of the sleeves, envelope and inflatable balloon in the duct after the beginning of introduction of a pressurized fluid.

FIG. 1b shows in section and schematically the arrangement of the internal lining sleeve applied against the inner wall of the duct, the resin having hardened, FIG. 2 shows schematically and by way of indication the arrangement of an assembly: sleeves, envelope, in a duct when this assembly is pulled along the duct, FIG. 3 shows a top view of a woven fabric whose weft includes a heating wire (electric) disposed in the direction parallel to the axis x—x of the sleeve and of the duct.

DESCRIPTION OF THE PREFERRED EMBODIMENT

In FIG. 1 one end of a duct C is shown.

The component parts of the final inner lining sleeve are shown—schematically and so as to give a better understanding of its formation using the method of the invention—without having any contact with each other, at the moment of application of the uniform pressure P by a fluid whose temperature and pressure are constantly controlled and determined, in a way known per se, depending on the conditions of the site (atmospheric temperature, instantaneous temperature, type of ground, condition of the underground water layer, type of product normally conveyed in the duct, etc.).

In a first embodiment, an assembly comprising an outer envelope 1 made from a sealed synthetic material and impermeable to fluids—for example P.V.C.—is introduced into the duct then a first sleeve 2 is introduced made from a composite material, with a glass mat and glass fabric basis for example, permeable over the whole of its thickness to a heat hardenable resin before polymerization and coated with such a resin, as well as a second sleeve 3 in the form of a sheet $3_1$ made from a synthetic material such as polyethylene, P.V.C., etc., whose upper face carries fibers capable of adhering to the lower face of said first sleeve 2 after hardening of the resin. These fibers $3_2$ may be made from polyester, glass, etc; they are implanted in the sheet $3_1$ by calendaring or flocking or any other method. The second sleeve 3 is in the form of a sealed balloon or mold which projects from the ends of the duct C. A duct 4 comprising a valve V and a pressure gauge M allows a pressurized fluid to be introduced into said balloon in the direction of the arrow f.

In general, sleeve 2 and sleeve 3 are prepared in the workshop.

Sleeve 2 is made from a composite material sheet; the ends of the sheet forming an overlapping joint. The connection between the two ends of the sheet forming the overlapping joint is provided (for example by loose stitching) so that one of the ends may slide with respect to the other. The section of the sleeve may then be enlarged without the composite material undergoing elastic or plastic deformation. Sleeve 3 is formed from a sheet of sealed synthetic material so that the outer face of the sleeve carries fibers $3_2$ which may be made from polyester, glass, etc. The edges of the sheet forming the joint of the sleeve are bonded or welded together This sleeve 3 may also be in the form of a balloon inflatable through a duct 4.

Sleeve 3 is introduced inside sleeve 2 in the workshop or in the factory, preferably. The assembly of sleeves 2 and 3 is folded and transported to the worksite.

It is on the worksite that sleeve 2 is coated with a heat hardenable resin, such as an epoxy resin, so that this resin penetrates through the whole thickness $e_{2a}$ of the sleeve.

The assembly of the two sleeves is then introduced into a tight synthetic material envelope 1 which may have been prepared in the workshop, the edges of the sheet forming the joint being sealingly joined together by bonding or welding for example. The length of envelope 1 is slightly less than the length of sleeve 2 so that the ends of sleeve 2 and of the balloon sleeve 3 extend from the ends of envelope 1. The length of sleeve 2 is at least equal to that of duct C.

The section $S_3$ of the balloon sleeve 3 is smaller than the section $S_2$ of sleeve 2, and the section $S_2$ is smaller than the section $S_1$ of the envelope.

The assembly: sleeve 2, 3 and envelope 1 is suitably folded (see FIG. 2) and after being introduced in duct C is pulled from one end of this duct to its other end.

Before inflation of the balloon sleeve 3 with a pressurized fluid, whose pressure and temperature are constantly controlled, the thickness of the sleeve 3 is $e_{3a}$, that of sleeve 2 is $e_{2a}$ and that of the envelope 1 is $e_{la}$.

When the pressure p acts uniformly on the inner face of the balloon sleeve 3, this latter is inflated and, so as to apply the fibers $3_2$ against the inner face of the resin coated sleeve 2, enlarges the section $S_3$ by plastic deformation of the sheet $3_1$. With the pressure p continuing to act, sleeves 2 and 3 enlarge their sections $S_2$ and $S_3$ until the outer face of sleeve 2 is applied against the inner face of the envelope 1. Under the continuous action of the pressure p, the section $S_1$ of envelope 1 is enlarged at the same time as the sections $S_2$ and $S_3$ until the external face of the envelope is firmly applied against the inner wall of the duct C. The thickness of the component parts of the final lining sleeve are then $e_{1b}$, $e_{2b}$ and $e_{3b}$. Whereas $e_{2a}=e_{2b}$, i.e. the thickness of sleeve 2 has not varied, $e_{1b}<e_{1a}$, and $e_{3b}<e_{3a}$, because the sheet $3_1$ of sleeve 3 has undergone plastic deformation and the envelope 1 has also been deformed by enlargement of its section $S_l$. The chosen pressure and temperature are maintained until the resin hardens. Sleeve 3 now adheres firmly by its outer face through all the fibers $3_2$ to the outer face of sleeve 2, the two sleeves 2 and 3 thus forming a composite assembly. The ends of sleeve 2 adhere directly to the inner wall of duct C. The small spaces 5 between the ends of the envelope 1 and the ends of the sleeve 2 which adhere to the wall of the duct C are filled by the surplus resin coming from sleeve 2; this surplus resin after hardening forms a seal preventing any possible infiltration between the envelope 1 and the external face of sleeve 2. The ends of the balloon sleeve 3 and possibly of sleeve 2 are cut which extend from the ends of duct C after reducing and completely removing the pressure p.

The use of an envelope is optional. It has certain advantages, for example for lining ducts of large section and/or ducts of great length, as will be mentioned hereafter.

Still within the scope of the invention, a balloon 6 may be used inflatable through a duct $4_1$ in the direction of the arrow $f_1$, which may be withdrawn after deflation and be used again. In this case, sleeve 3 is obviously not in the form of an inflatable balloon. The use of an inflatable and deflatable balloon which may be withdrawn may prove advantageous in certain cases.

In the particular embodiment shown in FIG. 3, a woven fabric 10 comprises longitudinal strands 30 disposed in the longitudinal direction of the fabric as shown by arrow $f_L$, and so in the direction of the longitudinal axis x—x of the lining sleeve and of the duct. Horizontal strands 20 disposed in the direction shown by the arrow $f_T$ which are substantially parallel to the inner face of the duct provided with a lining sleeve are interlaced with strands 30. This woven fabric forms at least one of the layers of the composite material of said first sleeve. Each strand 20, 30 may be a strip of an appropriate material, such for example as a synthetic material glass, ceramic, carbon and similar; or else be formed by a multiplicity of fibers of appropriate materials disposed side by side, or else by multifiber cores.

Heating elements in the form of metal wires 40 may be either disposed on certain strips or be integrated in the multiplicity of fibers forming the strands 30. These wires 40 are therefore an integral part of strands 30 and remain in the fabric after hardening of the resin, during application of the lining sleeve in the duct.

Only some of the strands $30_1$ are provided with heating elements 40. The distance a between these strands $30_1$—and possibly the diameter of the wires 40—is determined as a function of the atmospheric conditions, the conditions of the work site, of the resin used, of the desired hardening time for the resin, the dimensions of the duct, the shape of its section, etc. It is essential for the heat supplied by the elements 50 to be such that the polymerization (hardening) of the resin is substantially the same over the whole length of the sleeve and over the whole of its periphery during the lining operation. The ends of the wires 40 are connected to means for controlling the temperature, known per se, not shown in FIG. 4) these means being uncoupled after the lining operation.

Certain longitudinal strands may be entirely in the form of heating strips. The heating may be provided by electric or similar means, hot gases—in this case said heating strips are ducts for the gases—etc.

The use of a sleeve 2 has a number of advantages. Its presence increases the reliability in so far as sealing and resistance to different chemical materials are concerned, the material of the sheet $3_1$ being chosen accordingly. Also, it often reduces the friction coefficient of the fluid conveyed in the renovated duct.

The use of an envelope 1 is generally advantageous. In fact, the final lining sleeve becomes totally self supporting, the wall of duct C even greatly damaged only serving as support.

Furthermore, the method of the invention ensures even distribution of the resin over the whole length of the duct C, this distribution remaining even not only during translation of the assembly in the duct but also during the inflation operation.

Resin losses are completely avoided.

When lining is carried out using the known method, the resin coated ends of the sleeve folded back in duct C tend to draw close to the central part of the resin coated sleeve (see FIG. 2); the resin of the ends and the resin of the central part tend to be united. Thus, to begin the inflation operation, a relatively high pressure must be used. This drawback no longer exists if the method of the present invention is used. Thus, for a substantially constant pressure p, the whole of the lining sleeve opens out evenly.

Finally, the method of the present invention avoids any possible infiltration coming from the outside during the period of polymerization (or hardening) of the resin.

Numerous modifications and improvements may be made to the method and to the lining sleeve without for all that departing from the scope and spirit of the invention.

What is claimed is:

1. A method for internally lining ducts, comprising the following steps:
   (1) preparing the inner face of the duct;
   (2) preparing a first sleeve made from a composite material permeable to a heat hardenable resin and able to enlarge its section under the action of an internal pressure without said composite material undergoing elastic or plastic deformation;
   (3) preparing a second sleeve whose longitudinal edges are fixed together and which is made from a synthetic material having on its outer face fibers adhering to said first sleeve and a heat hardenable resin coated on the inner face of said first sleeve, said second sleeve only being able to enlarge its section under the action of a pressure by plastic deformation of the material forming it;
   (4) preparing an envelope whose longitudinal edges are fixed together and which is made from a synthetic material impermeable to the heat hardenable resin and whose section may enlarge under the action of a fluid;
   (5) preparing an inflatable balloon;
   (6) introducing said inflatable balloon into said second sleeve, said second sleeve and said inflatable balloon being introduced into said first sleeve;
   (7) impregnating said first sleeve with a heat hardenable resin, ensuring penetration of said resin over the whole thickness of said first sleeve as fas as its inner face;

(8) introducing into said envelope of the assembly including said first resin impregnated sleeve and at least said second sleeve and said inflatable balloon;

(9) introducing into the duct of the assembly, the assembly being folded so as to facilitate introduction thereof through one end of the duct and transporting thereof towards the other end of the duct;

(10) introducing a pressurized fluid into the inflatable balloon;

(11) enlarging the section of said second sleeve by plastic deformation of the synthetic material forming it until the outer fiber carrying face of said sleeve is applied against the inner face of said first sleeve and adheres to this face; and simultaneously enlarging the section of said first sleeve and of said second sleeve until the outer face of said first sleeve is applied towards the inner wall of the duct and against the inner face of said envelope, whose section enlarges simultaneously with sections of said first and second sleeves until the outer face of the envelope is applied firmly against the inner wall of the duct;

(12) maintaining the internal pressure and the temperature until the resin hardens; and

(13) totally deflating the balloon and then withdrawing the balloon.

2. Method as claimed in claim 1, wherein said envelope is slightly shorter than the duct, the ends of the first and second sleeve assembly then being directly applied against the inner wall at the ends of the duct for adhering thereto, the space between the ends of the envelope and the parts of said first sleeve adhering to the ends of the duct being filled with resin coming from said first sleeve, said resin forming a sealing plug after hardening.

3. A method for internally lining ducts, comprising the following steps:

(1) preparing the inner face of the duct;

(2) preparing a first sleeve made from a composite material permeable to a heat hardenable resin and able to enlarge its section under the action of an internal pressure without said composite material undergoing elastic or plastic deformation;

(3) preparing a second sleeve whose longitudinal edges are fixed together and which is made from a synthetic material having on its outer face fibers adhering to said first sleeve and a heat hardenable resin coated on the inner face of said first sleeve, said second sleeve only being able to enlarge its section under the action of a pressure by plastic deformation of the material forming it, said second sleeve being able to serve as an inflatable balloon;

(4) introducing said second sleeve into said first sleeve;

(5) impregnating solely said first sleeve with a heat hardenable thermosetting resin, ensuring penetration of said resin over the whole thickness of said first sleeve as far as its inner face;

(6) introducing into the duct of the assembly mentioned under item 5 above, the assembly being folded so as to facilitate introduction thereof through one end of the duct and transport thereof towards the other end of the duct;

(7) introducing a pressurized fluid into said second sleeve which serves as the inflatable balloon;

(8) enlarging the section of said second sleeve by plastic deformation of the synthetic material forming it until the outer fiber carrying face of said sleeve is applied against the inner face of said first sleeve and adheres to this face;

(9) simultaneously enlarging the section of the first sleeve and of said second sleeve until the outer face of said first sleeve is applied against the inner wall of the duct;

(10) maintaining the internal pressure and the temperature until the resin hardens; and

(11) progressively reducing the application pressure and cutting of the ends of said second sleeve which extend from the ends of the duct, the part of said second sleeve remaining in the duct, by its adherence to said first sleeve, having become an integral part of said composite material.

4. The method according to claim 3, including the preparation of an envelope whose longitudinal edges are fixed together and whichis made from a synthetic material impermeable to a heat hardenable resin.

5. The method of claim 4, including introducing into said envelope of the assembly said first resin impregnated sleeve and at least said second sleeve able to serve as an inflatable balloon.

6. The method of claim 4, wherein said envelope is slightly shorter than the duct, and including the step of applying the ends of the first and second sleeve assembly directly against the inner wall at the ends of the duct for adhering thereto, the space between the ends of the envelope and the parts of said first sleeve adhering to the ends of the duct being filled with resin coming from said first sleeve; and said resin forming a sealing plug after hardening.

7. A method for internally lining ducts, comprising the following steps:

(1) preparing the inner face of the duct;

(2) preparing a first sleeve made from a composite material permeable to a heat hardenable resin and able to enlarge its section under the action of an internal pressure without said composite material undergoing elastic or plastic deformation when submitted indirectly to fluid pressure;

(3) preparing a second sleeve whose longitudinal edges are fixed together and which is made from a synthetic material having on its outer face fibers adhering to said first sleeve and a heat hardenable resin coated on the inner face of said first sleeve, said second sleeve only being able to enlarge its section under the action of a pressure by plastic deformation of the material forming it;

(4) preparing an inflatable balloon, introducing said inflatable balloon into said second sleeve, and introducing said second sleeve and said inflatable balloon into said first sleeve;

(5) impregnating solely said first sleeve with a heat hardenable thermosetting resin, ensuring penetration of said resin over the whole thickness of said first sleeve as far as its inner face;

(6) introducing into the duct of the assembly mentioned under item 5 above, the assembly being folded so as to facilitate introduction thereof through one end of the duct and transport thereof towards the other end of the duct;

(7) introducing a pressurized fluid into said second sleeve which serves as the inflatable balloon;

(8) enlarging the section of said second sleeve by plastic deformation of the synthetic material forming it until the outer fiber carrying face of said second sleeve is applied against the inner face of said first sleeve and adheres to this face;

(9) simultaneously enlarging the section of the first sleeve and of said second sleeve until the outer face of said first sleeve is applied against the inner wall of the duct;

(10) maintaining the internal pressure and the temperature until the resin hardens; and

(11) progressively reducing the application pressure and cutting of the ends of said second sleeve which extend from the ends of the duct, and part of said second sleeve remaining in the duct, by its adherence to said first sleeve, having become an integral part of said composite material.

8. The method of claim 3, including totally deflating said second sleeve serving as the balloon.

9. The method according to claim 7, including preparation of an envelope whose longitudinal edges are fixed together and wherein the axial length of said envelope is shorter than the duct, and introducing into said envelope an assembly consisting of said first and said second sleeves and said inflatable balloon, said envelope protecting said first sleeve after introduction into said duct.

10. An inner lining sleeve for a duct, having component parts including:

a first sleeve made from a composite material permeable to a heat hardenable resin;

a second sleeve in the form of sealed sheet made from a synthetic material having fibers on its outer face, said second sleeve adhering with its fiber carrying surface to said first sleeve so as to form an integral part of the composite material after hardening of the resin; and a sealing envelope impermeable to a heat hardenable resin being provided surrounding said first sleeve.

11. The inner lining sleeve as claimed in claim 10, wherein one of the component parts includes a sealing envelope impermeable to a heat hardenable resin surrounding said first sleeve.

12. The inner lining sleeve as claimed in claim 10, wherein at least one of the component parts include by incorporating into it at least one heating element and at least one of the ends, said heating element being connected to means for controlling the temperature during the hardening period of said resin, said at least one heating element being incorporated in one of the layers of the composite material of said first sleeve.

13. The sleeve as claimed in claim 10, including at least one heating element incorporated in one of the layers of the composite material of said first sleeve.

14. The sleeve as claimed in claim 12, wherein said at least one heating element is operatively associated with at least one strand in a direction parallel to the longitudinal axis x—x of the sleeve and of the duct of the woven fabric which forms at least one of the layers of said composite material.

15. The sleeve as claimed in claim 14, including a plurality of said at least one heating element incorporated in a non-woven fabric in the direction parallel to the longitudinal axis x—x of the sleeve and of the duct, which forms at least one layer of said composite material.

16. The sleeve as claimed in claim 12, including a plurality of said at least one heating element incorporated in a non-woven fabric in the direction parallel to the longitudinal axis x—x of the sleeve and of the duct, which forms at least one layer of said composite material.

17. The sleeve as claimed in claim 12, wherein said at least one heating element is in the form of metal wires or strips, the heating being provided by electric means.

18. The sleeve as claimed in claim 13, wherein said at least one heating element is in the form of a metal wire or strip, the heating being provided by electric means.

19. The sleeve as claimed in claim 15, wherein said heating elements are in the form of metal wires or strips, the heating being provided by electric means.

* * * * *